Sept. 24, 1957 — W. J. BOEHNKE — 2,807,380
DEVICES FOR REMOVING VEHICLE WHEELS
Filed Feb. 21, 1955 — 2 Sheets-Sheet 1
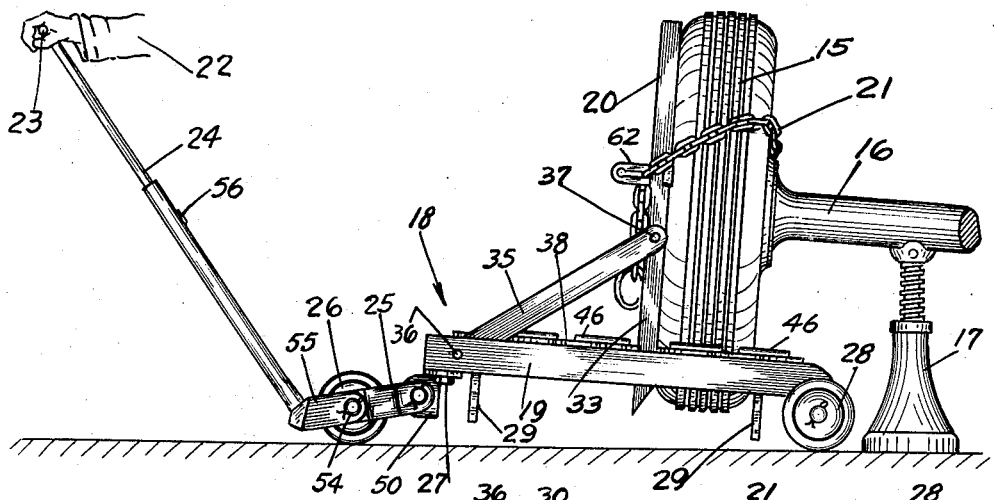
FIG. 1.
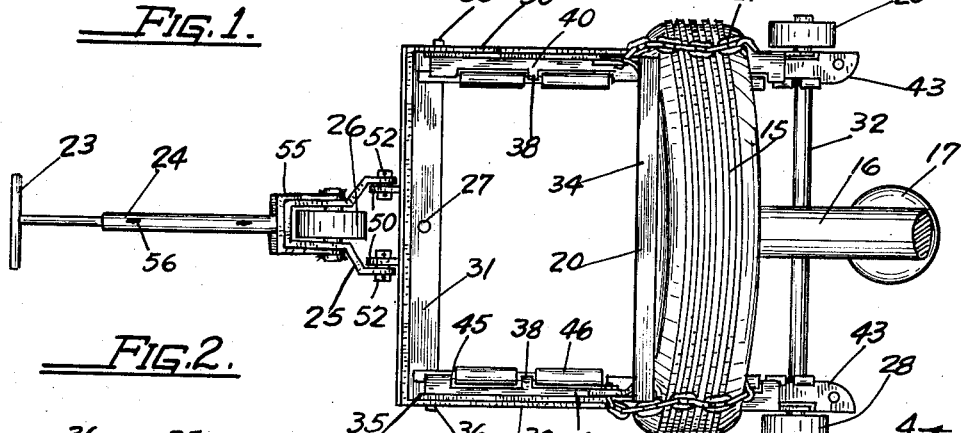
FIG. 2.
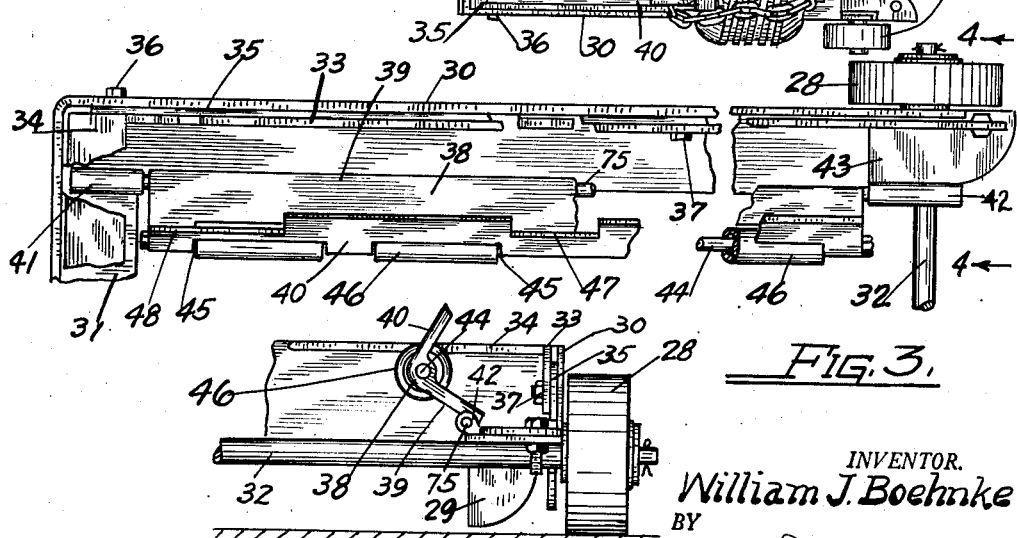
FIG. 3.
FIG. 4.
INVENTOR.
William J. Boehnke
BY 
ATTORNEY Sept. 24, 1957  W. J. BOEHNKE  2,807,380
DEVICES FOR REMOVING VEHICLE WHEELS
Filed Feb. 21, 1955  2 Sheets-Sheet 2
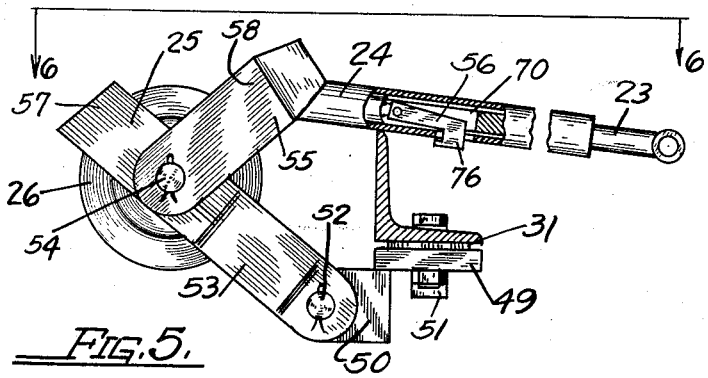
FIG. 5.
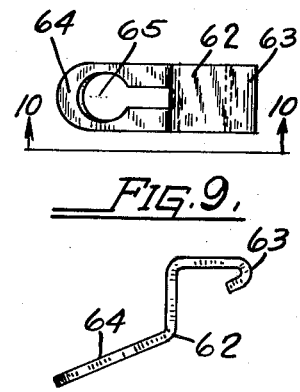
FIG. 9.
FIG. 10.
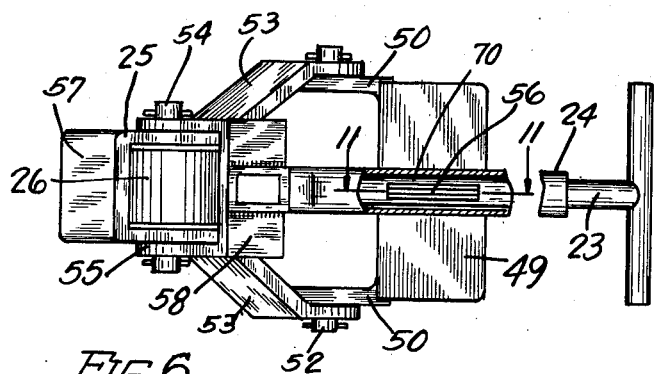
FIG. 6.
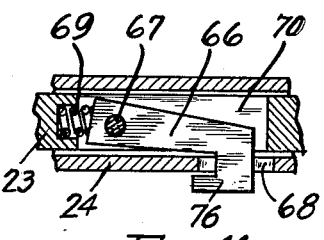
FIG. 11.
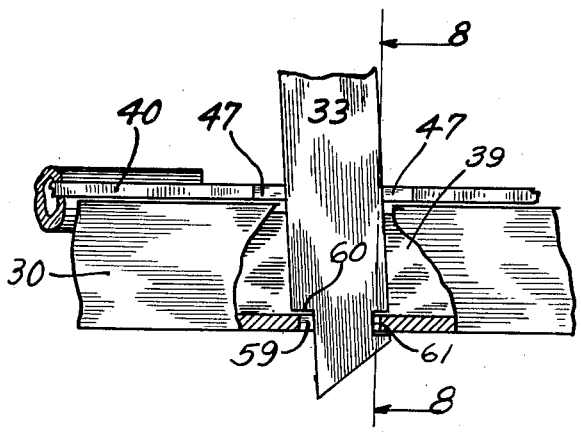
FIG. 7.
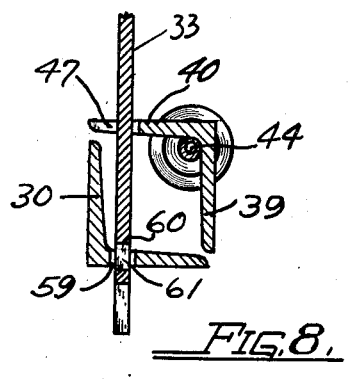
FIG. 8.
INVENTOR.
William J. Boehnke
BY
Martin E. Anderson
ATTORNEY

United States Patent Office

2,807,380
Patented Sept. 24, 1957

2,807,380

DEVICES FOR REMOVING VEHICLE WHEELS

William J. Boehnke, Fort Collins, Colo.

Application February 21, 1955, Serial No. 489,707

2 Claims. (Cl. 214—332)

This invention relates to devices for removing vehicle wheels and more particularly to a wheel supported dolly having a tilting frame for use in removing vehicle wheels.

One of the most difficult and time consuming operations facing a garage, trucking company, or farm implement repair shop, is the frequent necessity of removing the large vehicle wheels used on trucks, tractors and the like. Single wheels and tires sometimes weigh as much as 500 lbs. and may weigh considerably more if they are filled with water or some other liquid to provide better traction, as in the case of tractor wheels. Dual wheels, on the other hand, are known to weigh as much as 2000 lbs. Seldom, if ever, can a man working unassisted remove wheels of the type described above. Even when two or more men work together in removing them, several hours may be spent before a wheel is demounted. In this type of work there is always considerable danger in one of the wheels falling upon the mechanic who is endeavoring to remove it. However, the problem encountered most frequently is that the grease seals and bearings are very often damaged at the time the wheel passes over the end of the axle or hangs up upon the brakeshoe. This means that the wheel must again be removed if the damage occurs while it is being put back on the vehicle in order to replace the damaged part. A common method of removing a wheel is to jack it up and have two workmen on opposite sides walk the wheel off the axle with a crowbar. Another method is to elevate the wheel and place a heavily greased plate beneath it whereupon it is lowered on the plate and an attempt made to slide the wheel off on the greased plate. Both of these methods are difficult, time-consuming, dangerous, and require at least two workmen working on the wheel.

Among the objects of the present invention are: to provide a wheel supported cart having means for tilting the frame into substantially parallel relationship with the truck axle; whereupon, the wheel can be secured to the cart and taken off in a direct line with the axle thereby leaving the bearings and grease seals intact; to provide a device of the type described which can be operated by one man to remove even the largest vehicle wheels; to provide a wheel cart which eliminates the danger of the wheel falling on the repairman; and to provide a wheel dolly which is simple, rugged, inexpensive, and versatile.

Other objects will be in part apparent and in part pointed out specifically hereinafter in connection with the description of the drawing which follows; and in which, Figure 1 is a side elevation of the claimed device showing it attached in position to remove a truck wheel;

Figure 2 is a top plan view of the wheel dolly, wheel and axle shown in Figure 1;

Figure 3 is a top plan view on an enlarged scale showing one leg of the main frame and one leg of the auxiliary frame in retracted position, parts of which have been broken away to conserve space;

Figure 4 is an end view taken in the direction of arrows 4—4, Figure 3;

Figure 5 is a side elevation of the yoke, pivot wheel, transverse main frame member and handle, parts of which have been broken away to conserve space;

Figure 6 is a top plan view taken in the direction of arrows 6—6, Figure 5;

Figure 7 is a fragmentary side elevation showing the locking device by which the base of the auxiliary frame is connected within the main frame, parts of which have been broken away to better show the construction;

Figure 8 is a section taken along line 8—8, Figure 7;

Figure 9 is a top plan view of the chain fastener;

Figure 10 is a side elevation of the chain fastener taken in the direction of arrows 10—10, Figure 9; and Figure 11 is an enlarged fragmentary section of the handle lock taken along line 11—11, Figure 6.

This application is a continuation in part of application Serial No. 272,357, filed February 19, 1952, and which has since been abandoned.

Referring now in particular to Figure 1 of the drawing, reference numeral 15 designates a truck tire secured by conventional means to an axle 16. The wheel and axle are elevated above ground level by means of jack 17 engaging the under surface of the axle. The wheel dolly of the present invention, indicated in a general way by numeral 18, is shown with the main frame 19 inclined to engage the under surface of the wheel while lying in a plane substantially parallel to the angle of inclination of the axle above the floor. Auxiliary frame 20 which is substantially perpendicular to the main frame lies parallel to the surface of the wheel to which it is removably secured by means of chain 21. The inclination of the main frame is brought about by the downward pressure of hand 22 upon handle 23 which acts through lever arm 24 to pivot yoke member 25 about pivot wheel 26 to elevate the forward end of the wheel dolly. With the wheel dolly secured to the wheel in the position shown in Figure 1 and the wheel securing lugs or bolts removed, a slight lateral back and forth movement of the handle about the pivot wheel and pivot 27 will cause a movement in the main frame and auxiliary frame which will easily walk the wheel off the axle or the brake drum in a direct line with the center line of the axle, without damage to the grease seal, brake drum and bearings. Once the wheel is free of the truck it may easily be transported to the desired location on support wheels 28 and the pivot wheel. Once the downward force upon handle 23 is released, the weight of the vehicle wheel and the wheel dolly will be sufficient to cause pivotal movement of the yoke in the opposite direction, thus lowering the main frame until lugs 29, shown most clearly in Figure 4, on the under side of the main frame rest on the floor and prevent further movement.

As will be seen in Figure 2, the main frame comprises two longitudinal side legs 30 comprising angle irons having their horizontal flanges turned inwardly. The legs are rigidly connected and held in spaced substantially parallel relation by a forward transverse leg 31. Rigidly secured to the rear ends of the side legs 30 is the transverse axle 32 on the ends of which are journaled the respective support wheels 28. In general, main frame 19 is rectangular in shape having the side legs 30 spaced apart a distance which will permit them to engage a wheel as shown in Figures 1 and 2. Larger wheels than those shown could be effectively removed with the dolly; however, if the wheel were much smaller the main frame could not be pivoted into engagement with the wheel at the point at which it was also parallel to the axle.

Figure 3 shows in detail the construction of the side legs 30 and their relationship with the forward transverse arm, support wheel and axle. Figure 3 is also illustrative of the position of the auxiliary frame when it is folded down into the main frame for convenient storage. Some large dual wheels may be sufficiently wide, if removed together, not to require the use of the auxiliary frame as there would be little danger of their tipping from the cart. However, for safe operation, it is preferable to use the auxiliary frame in all cases to prevent accidental injury. It may, of course, be necessary to extend the side legs rearward of the auxiliary frame a greater distance than that shown in order to accommodate dual wheels having tires as wide as the single wheel illustrated. Auxiliary frame 20 shown in Figures 1 through 3, comprises two substantially parallel side arms 33, rigidly connected at their upper ends to a transverse arm 34. The lower ends of the side arms are removably locked within the main frame as will be described in detail in connection with Figures 7 and 8 hereof. A strut member 35, shown most clearly in Figure 1, is pivotally connected at its forward end to the forward end of the vertical flange on leg 30, one of said struts being provided on each side of the dolly. The rear or upper end of the strut is pivotally connected to the side arm; thus, when not in use, the cart can be stored with the auxiliary frame closed down into the main frame by merely releasing the lower end of the auxiliary frame from locked connection with the main frame and moving the transverse arm forward and downward about pivots 36 and 37. In the preferred embodiment of the above invention, two roller legs 38 are pivotally mounted in position along the inner edge of legs 30. When pivoted into closed position as shown most clearly in Figure 8, and also in Figures 1 and 2, the roller legs are shown to consist of angle irons having a vertical flange 39 and a horizontal flange 40 positioned with respect to the side legs 30 to form a generally rectangular opening into which the auxiliary frame may be folded. Each of the roller legs includes a pivot shaft 75 journaled along the lower edge of the vertical flange 39 for pivotal movement within bushing 41 welded to forward transverse leg 31 and rear bushing 42 welded to plates 43 which are bolted to the rear ends of the side legs in position to extend behind the wheels and provide supports on which the wheel dolly may stand in the upright position for storage. A roller axle 44 is journaled inside each of the roller legs between the vertical and horizontal flange. A plurality of roller openings 45 are positioned along the roller axle in the roller legs to receive rollers 46 for rotational movement about the roller axle. When the roller leg is in closed position the rollers provide the surface on which the vehicle tire rides thus permitting the wheel and tire to be rotated on the cart for inspection, or, in order that it may be lined up properly for remounting upon the truck. An opening 47 is provided in the outer edge of horizontal flange 40 to receive sidearm 33 of the auxiliary frame in upright position. A second opening 48 is positioned near the forward end of the horizontal flange to receive the forward end of strut 35.

Referring now to Figure 4, the manner in which sidearm 33 and transverse arm 34 of the auxiliary frame pivot about pivots 36 and 37 to fold down into the rectangular space between side leg 30 and roller leg 38 may be seen. This view also shows the position and shape of downwardly extending lugs 29 welded to the lower side of the horizontal flange of the side legs. The manner in which the roller legs are pivotally mounted on the side legs is also quite clearly shown in this view.

In the enlarged view of yoke member 25 shown in Figures 5 and 6, it will be seen that a pivot plate 49 formed with parallel forwardly extending vertical flanges 50 is pivotally connected by means of pivot bolt 51 to the mid-point of the horizontal flange on forward transverse legs 31. The forward end of vertical flanges 50 are pivotally connected to the rear ends of yoke arms 53 of substantially U-shaped yoke member 25 by means of a yoke axle 52. Pivot wheel 26 is journaled within the forward end of yoke member 25 on pivot wheel axle 54. A substantially U-shaped handle yoke 55 is also pivotally connected near the ends of the legs to pivot wheel axle 54. The closed end of the handle yoke is rigidly secured to lever arm 24 which normally extends upward and forward from the yoke, as shown in Figures 1 and 2, hereof.

Figures 5 and 6 also show the lever arm pivoted rearward into the position for storage. Handle 23 is mounted for adjustable movement within lever arm 24 and provided with a lock device 56 which will be described in detail in connection with Figure 11. The forward end 57 of the yoke member is inclined upward and rearwardly providing a stop against which a similarly inclined surface 58 on the closed end of the handle yoke bears when said handle yoke is in the operative position shown in Figures 1 and 2.

Figures 7 and 8 illustrate the means by which the side arms 33 of the auxiliary frame are locked adjacent their lower ends within the horizontal flange of side legs 30. A longitudinal slot 59 in Figures 3, 7 and 8, receives the pointed lower end of side arm 33. The forward edge of the side arm is cut inward slightly forming a narrower lower end which will pass through the hole and also provide a shoulder 60 on which the weight of the side arms and the demounted wheel rest. A notch 61 is provided in the rear edge of the side arm adapted to receive the portion of the horizontal flange of side leg 30 which forms the rear edge of opening 59, thereby locking the auxilary frame within the main frame. The notch is positioned on the rear edge in order that the auxiliary frame cannot tip forward. The force of the weight of the wheel in the position shown in Figures 1 and 2 tends to tip the auxiliary frame backward, however, a force in this direction has little tendency to disengage the auxiliary frame from the main frame.

Figures 9 and 10 show a removable chain fastener 62 having a hook portion 63 adapted to hook onto the rear edge of side arm 33 and pass transversely inside of said side arm; whereupon, it is bent in the direction of the end of the hook in order to pass in front of the forward edge of side arm 33 thence forwardly to form member 64 which contains key slot 65. The circular portion of key slot 65 is positioned in the forward end of member 64 adapted to permit adjustment in the length of the chain; whereas, the rectangular portion of said key slot extends rearwardly to form a lock for the chain. The manner in which the chain fasteners are used and their position on the auxiliary frame are most clearly shown in Figures 1 and 2.

Figure 11 shows in section the lock device 56 positioned within handle 23 which locks the handle within lever arm 24. The handle member as shown has been formed of a solid piece of metal having a generally rectangular cross-section and provided with an opening 70 extending vertically and longitudinally adjacent the lower end of said handle. A hook lock 66 is pivotally mounted on pivot 67 adjacent its forward end as viewed in Figure 5 within opening 70 having the hook portion 76 extending downward through slot 68 in lever arm 24. A compression spring 69 is positioned between the forward end of opening 70 and the forward end of the hook lock 66 tending to force the hook portion 76 of the hook lock out through slot 68 in the lever arm. One or more slots 68 may be provided in the lever arm so that adjustment of the effective length of the handle may be made. This adjustment makes it possible to use a long handle whenever a heavy load is to be raised, and a short handle when the load is light or the wheel dolly is to be stored. The hook lock is preferably positioned with respect to the handle as shown in Figure 5 because the greatest force applied to the handle is that force applied downward in the direction of the pivot wheel when removing a vehicle wheel.

In order to remove a vehicle wheel with a wheel dolly constructed in accordance with the present invention, it is first necessary to elevate the wheel and axle in place on the truck as shown in Figures 1 and 2. The handle is adjusted with respect to the lever arm to give the desired mechanical advantage and the handle locked in place. A forward and downward pressure on the handle will act through the yoke member to pivot the forward end of the main frame upwardly thus releasing lugs 29 from engagement with the floor and permitting the wheel dolly to be moved to the truck. The rear end of the wheel dolly is then moved under the raised wheel to a position under the truck where upon further elevation of the forward end of the dolly the main frame will lie in a plane parallel to the center line of the axle at the time the side legs engage the under surface of the tire and the auxiliary frame will lie against the face of the wheel and tire. A short length of chain is then passed behind the tire above the axle and tightened and locked within the key slots in the chain fasteners. The original adjustment of the chain need not be too tight as jiggling the wheel dolly by the handle will cause the chain fasteners to slide down the side arms of the auxiliary frame until the chain is tightened. In order to free the wheel from the brakeshoe without damage to either the grease seal or bearings it is only necessary to move the handle back and forth in a horizontal plane while steadily walking it off the end of the brake drum parallel to the center line of the axle. Once the wheel is freed, it may be readily transported to any desired location by merely pulling forward on the handle which will raise the lugs off the floor and permit the wheel dolly to be moved. As soon as the handle is released, the weight of the wheel dolly is sufficient to pivot the handle upward allowing the forward end of the frame to move downward until the lugs engage the floor and prevent further movement. If necessary, the wheel can be rotated on the rollers journaled within the roller legs for purposes of inspection. When the wheel is replaced, the above process is repeated with the additional step of rotating the wheel on the rollers until the holes in the wheel are in proper alignment with the bolts on the brake drum. As has already been mentioned, in the case of dual wheels the auxiliary frame may be folded within the main frame providing the width of the dual wheels is sufficient to eliminate any danger that they might fall off the dolly. In order to store the cart conveniently out of the way, the hook lock 76 is moved upward in the slot in the lever arm against the compression spring whereupon the handle can be telescoped within the lever arm. The roller legs 38 are pivoted inwardly to permit the auxiliary frame to be folded down within the main frame. In order to release the side arms of the auxiliary frame 20 the transverse arm 34 is moved rearward which moves the notch 61 in the lower end of the side arm forward to free it from the horizontal flange of the side legs permitting the side legs to be withdrawn and the transverse arm of the auxiliary frame moved forward and downward about the pivot points 36 and 37 on the strut until it lies within the main frame. Whereupon, the roller legs are moved outward pivotally to close over the auxiliary frame. The handle and lever arm are then pivoted rearwardly and downwardly about the pivot 54 on the handle yoke into the space between the side legs of the main frame. The forward end of the dolly may be raised to lay against the wall as plates 43 extending behind the support wheel bear on the floor.

It will thus be seen that the many advantageous results and objects sought for the present invention have been fulfilled and; therefore, I claim:

1. In a wheel removing device of the type having a main frame comprising a forward transverse leg from which two side legs extend rearwardly in spaced parallel relation, wheels operatively associated with the rear ends of the side legs, and means comprising a lever pivotally attached to the transverse leg of the frame for upward and downward movement, a wheel mounted on the lever in spaced relation to the pivot for rolling movement along the ground and a handle depending from the lever for raising and lowering the front end of the frame; means for supporting a wheel in vertical position on the main frame comprising an auxiliary frame comprising a transverse arm from the ends of which two side arms extend downwardly in parallel relation, and means for pivotally and foldably attaching the auxiliary frame to the main frame, said means comprising struts pivotally connected at their front ends with the side legs of the main frame and at their rear ends with the side arms of the auxiliary frame at points intermediate their ends, the side legs of the main frame having inwardly directed opposed flanges each provided with an opening for the reception of the lower end of one of said side arms, means for limiting the downward movement of the side arms with respect to said flanges, the distances from said openings to the points where the struts are pivoted to the side legs and the side arms of the auxiliary frame have the relations of a right angular triangle in which the side arms of the auxiliary frame form the vertical side and said flanges of the base.

2. A device in accordance with claim 1 in which the lower ends of the side arms are provided with means forming an interlock with said flanges for resisting forces tending to move said arms upwardly relative to the flanges.

References Cited in the file of this patent

UNITED STATES PATENTS

| | | |
|---|---|---|
| 639,338 | Barns | Dec. 19, 1899 |
| 1,138,422 | Spangenberg | May 4, 1915 |
| 1,374,986 | Carter | Apr. 19, 1921 |
| 1,814,110 | Barrett | July 14, 1931 |
| 1,916,850 | Pehrsson | July 4, 1933 |
| 2,212,053 | Smith | Aug. 20, 1940 |
| 2,410,902 | Roberts | Nov. 12, 1946 |
| 2,471,051 | Tway | May 24, 1949 |
| 2,483,908 | Jackson | Oct. 4, 1949 |
| 2,613,084 | Burch | Oct. 7, 1952 |